May 26, 1959 D. W. MADDEN 2,888,123
GUARD MECHANISM
Filed Dec. 23, 1955 2 Sheets-Sheet 1
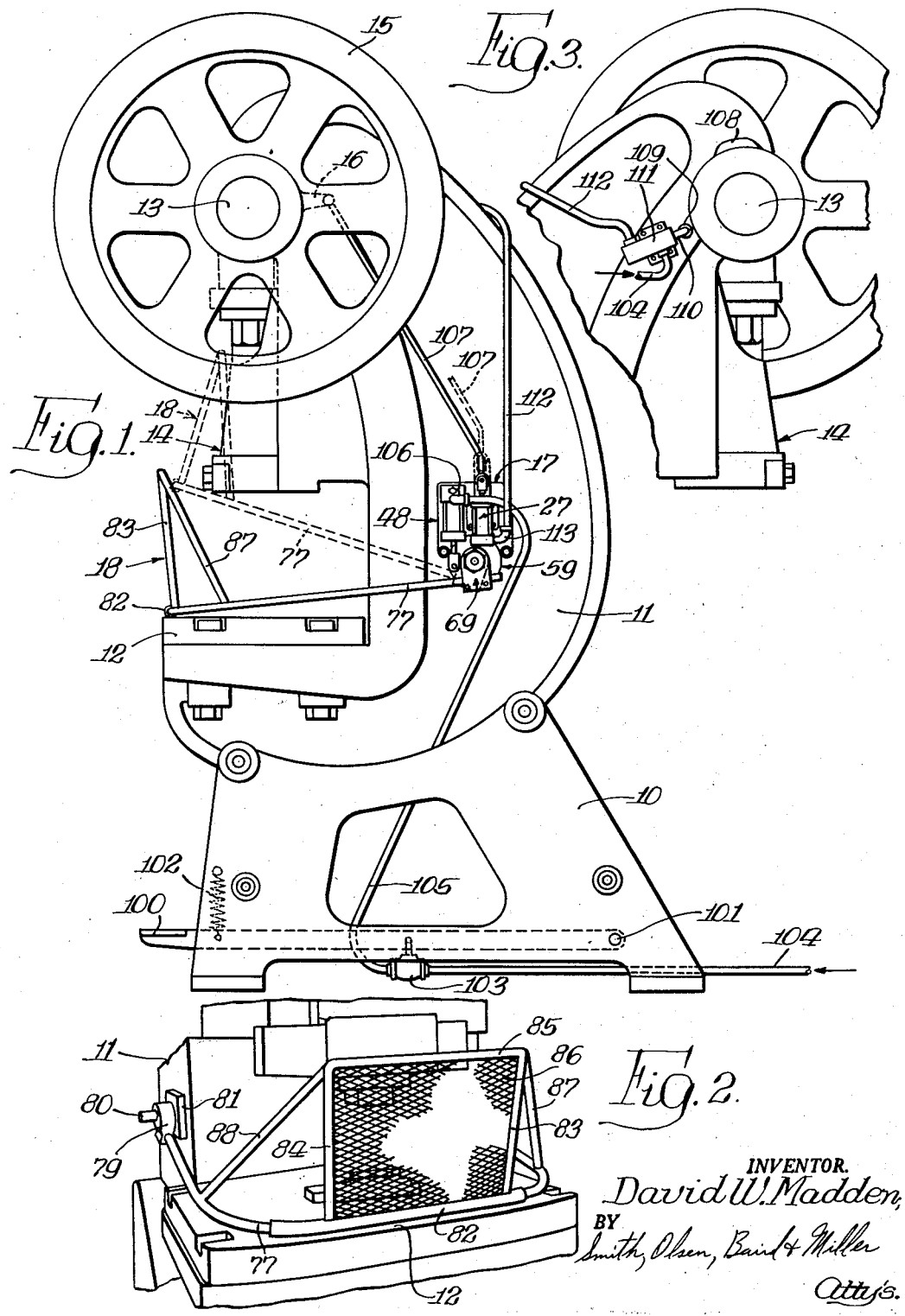
INVENTOR.
David W. Madden,
BY
Smith, Olsen, Baird & Miller
Attys.

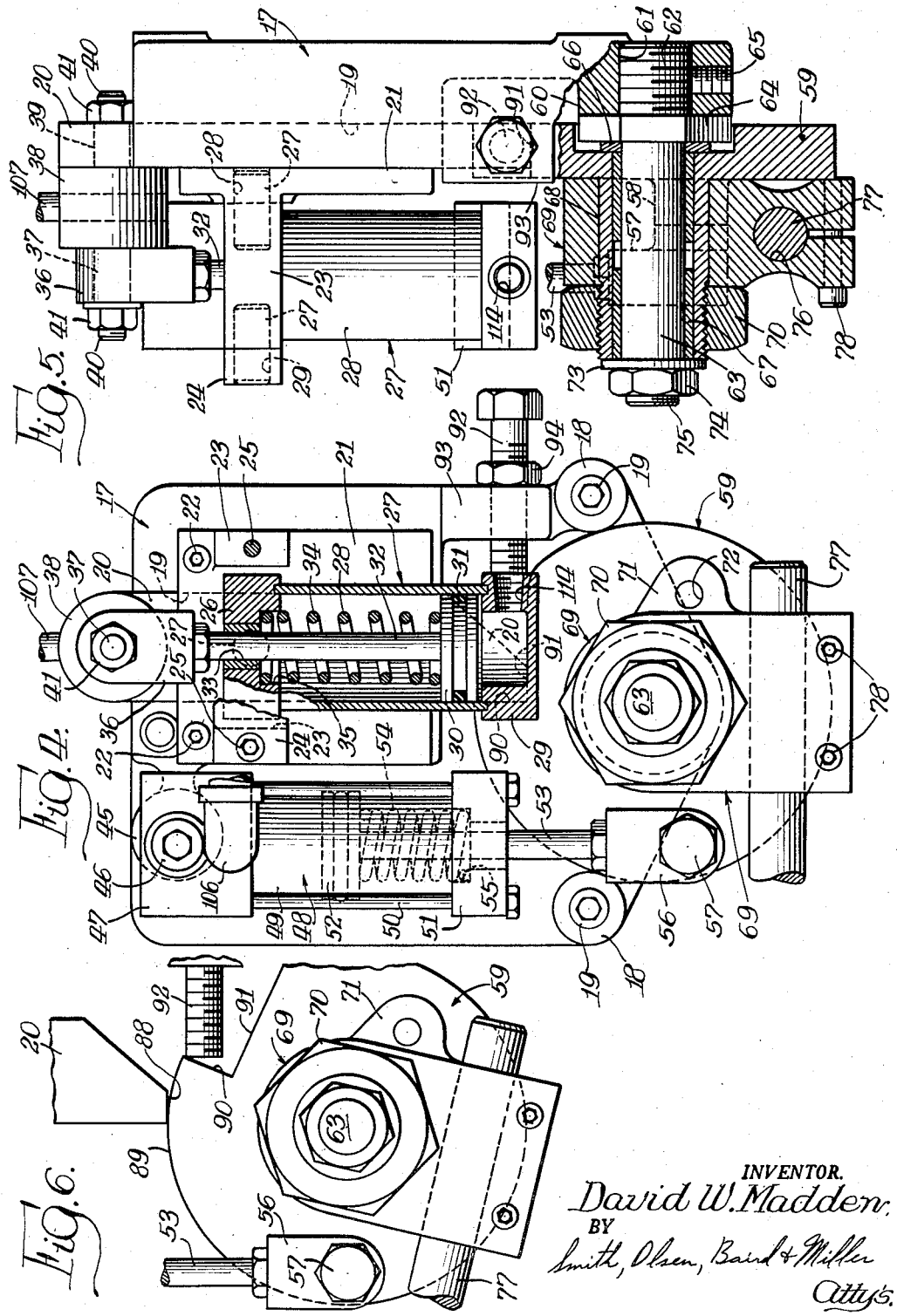

United States Patent Office 2,888,123
Patented May 26, 1959

2,888,123

GUARD MECHANISM

David W. Madden, Chicago, Ill.

Application December 23, 1955, Serial No. 555,124

1 Claim. (Cl. 192—134)

The present invention pertains to guard devices for power operated machine tools and more particularly to a highly improved guard mechanism especially useful in conjunction with any of a variety of machine tools of the punch press type having a clutch, or the equivalent, that is engaged and disengaged to produce intermittent work strokes upon a work-piece being operated upon by the machine.

One of the principal objects of the invention, in its broadest sense, is to provide a greatly simplified and fool-proof guard mechanism for a machine tool of the kind referred to above comprising a guard assembly movable between a retracted position, permitting access to the work-piece receiving area of the machine, and a safety position blocking the operator from access to the area, wherein the guard assembly physically obstructs and positively prevents operation of a clutch engaging means at all times except when the guard assembly has been moved fully into its safety position, and wherein the clutch operating means, on the other hand, physically locks the guard assembly in its safety position and positively retains the same in that position until the clutch operating means has been returned to a position preventing engagement of the clutch. It will be appreciated that, with a safety mechanism of this kind, the operator cannot inadvertently cause operation of the machine while his hands are in the work area of the machine, for the clutch operating means cannot be caused to engage the clutch until the guard assembly is fully in its safety position and the guard assembly also cannot be retracted to permit access to the area until the clutch operating means has been returned to the position preventing engagement of the clutch.

Another object of the invention is to provide in a guard mechanism of the kind just stated, means for automatically actuating the clutch operating means in response to movement of the guard assembly fully into its safety position thereby initiating a work stroke by the machine, and means responsive to the performance of the work stroke by the machine for restoring the clutch operating means and thereby unlocking the guard assembly to permit restoring movement of the guard assembly to its retracted position at the end of the work stroke. Still another object of the invention is to provide, in the safety mechanism, means for automatically restoring the guard assembly to its retracted position in response to restoration of the clutch operating means to its position preventing engagement of the clutch.

In the use of the present safety mechanism, the operator of the machine operates the guard assembly in order to control the machine tool per se. To this end, the safety mechanism is preferably provided with a manually operated lever or foot treadle, or the like, which the operator actuates when he is ready for the machine to make a work stroke. Actuation of this lever or treadle causes the guard assembly to move from its retracted position toward its safety position. In the absence of such a lever or treadle, the operator may move the guard assembly manually toward its safety position. If the work-piece receiving area of the machine is free of obstructions, the guard assembly reaches its full safety position, whereupon the clutch operating means is freed for movement and is automatically actuated to engage the clutch and cause the machine tool to begin a work stroke. The actuating movement of the clutch operating means, while causing the clutch to engage, also carries the clutch operating means into a position physically obstructing restoring movement of the guard assembly, thereby positively preventing restoring movement of the guard assembly from its full safety position while the clutch operating means is in the "clutch engaged" position. Restoring movement of the parts of the safety mechanism is automatic and is initiated in response to the performance of the work stroke of the machine. To this end, means are provided responsive to the work stroke to return the clutch operating means to its original position to cause disengagement of the clutch when the work stroke has been completed. This restoration of the clutch operating means frees the guard assembly for returning movement to its retracted position, which movement is also preferably carried out automatically, provided the operator has removed his foot or hand from the guard operating lever. As the guard assembly leaves its full safety position it again physically obstructs movement of the clutch operating means and thus positively assures against inadvertent operation of the machine.

These and other objects and advantages of the present invention will be apparent from the following description of a preferred embodiment thereof, taken with the accompanying drawings wherein:

Fig. 1 is a side elevational view of a conventional punch press equipped with the safety guard mechanism of the present invention, the guard on the press being shown in its lowered or safety position in full lines and in its raised or retracted position by broken lines;

Fig. 2 is a fragmentary perspective view of the front of the press showing the guard in its lowered, safety position;

Fig. 3 is a fragmentary elevational view of the upper portion of the side of the press opposite that shown in Fig. 1;

Fig. 4 is an elevational view on an enlarged scale of the principal operating assembly of the present safety device, certain portions thereof being cut away for clearness of illustration, the parts thereof being shown in the positions they occupy when the guard assembly is in its safety position;

Fig. 5 is a side view of the device shown in Fig. 4, taken from the right-hand side thereof with the lower portion of the assembly being shown in cross-section; and Fig. 6 is a fragmentary diagrammatic view showing a trip cam or disc and a cooperating latching slide or dog in the relative positions occupied thereby when the guard is in its raised position.

Referring now to the drawings, the safety mechanism of the present invention is shown embodied in an ordinary punch press having a base portion 10 and an upright C-shaped main frame 11 having mounted thereon a work bed 12 adapted to carry any suitable die of the kind normally employed in punch press operations. At the upper end of the C-shaped frame 11 there is transversely mounted a crank shaft 13 which causes a punch assembly 14 of the press to be raised and lowered in the usual manner so as to cooperate with the die to form a work piece. At one end of the crank shaft 13 there is a flywheel 15 by which the press is driven by a belt or any other suitable means, and the press is provided with a clutch of any suitable construction for connecting the flywheel 15 to the crank shaft 13 to cause the punch to be driven downwardly and then to be raised upwardly in a work stroke whenever a clutch operating arm 16 is pulled downwardly. The construction of such clutches is a well known art and it will be understood that the operation and performance of the safety device of the present invention is in no way dependent upon any particular clutch construction.

The principal operating assembly of the present safety mechanism is mounted on one side of the C-shaped frame 11 of the press. This assembly (Figs. 1 and 3) comprises a mounting or base plate 17 having a plurality of circular bosses 18 formed thereon through which Allen-head screws 19 extend and are threaded into suitable openings drilled or otherwise provided in the side of the C-shaped frame 11. The base plate 17, broadly speaking, is of rectangular shape and has mounted thereon the means for lowering a guard assembly 18 to a safety or obstructing position in front of the work-piece receiving area of the work bed 12 and means for retaining the guard in that position for so long as the press is in condition to cause the punch assembly 14 to be lowered. The base plate 17 has formed in its face, a vertical slot 19 for slidably containing a dog or slide 20 adapted to be moved up and down, as will be explained later. This slide is retained in the slot 19 by a rectangular retaining plate 21 that is secured, as by screws 22, to the face of the base plate 17 in position across the slot 19. The retaining plate has a pair of forwardly projecting, laterally spaced legs 23 formed thereon that are joined at their outer ends by a trunnion plate 24 attached to the legs as by screws 25, thereby providing a rectangular frame defined by the retaining plate, the two forwardly projecting and spaced-apart legs 23, and the trunnion plate 24. Within this rectangular frame there is located the upper head member 26 of a cylinder designated generally by the numeral 27. This upper head member is pivotally mounted within the frame by a pair of dowels 27 (Fig. 5) that are press fitted into appropriate openings provided on opposite sides of the head, the dowels in turn rotatably riding as trunnions in appropriate openings 28 and 29 provided, respectively, in the retaining plate 21 and the trunnion plate 24, thereby providing a swivel type mounting for the upper end of the cylinder 27.

The cylinder 27 is provided with a cylinder wall 28 secured in any suitable manner, such as by tie rods or the like, to the underside of the upper head member 26 and to a corresponding lower head member 29. The cylinder is provided with a piston 30 having a packing ring 31 and a piston rod 32 which extends upwardly from the piston and through a suitably packed opening 33 in the upper head member 26. The piston rod has a helical compression spring 34 mounted thereabout, the lower end of the spring bearing upon the upper side of the piston 30 and its upper end residing in a recess 35 formed in the underside of the upper head member 26 concentrically with the piston rod opening 33 therein. The upper exterior end of the piston rod 34 has threaded or otherwise secured thereto a clevis 36 which is rotatably received upon a cylindrical rod-like projection 37 (Fig. 5) formed on one side of a swivel member 38, the swivel member 38 having another cylindrical rod-like projection 39 formed on its other side that is rotatably received in the upper end of the dog or slide 20. The outer ends of the cylindrical rod-like projections 37 and 39 may be of reduced diameter and may be threaded, as at 40, to receive nuts 41 for retaining the clevis 36 and the dog or slide 20 thereon. From the foregoing description, it will be understood that, through the agency of the swivel member 38 and its projecting cylindrical members 37 and 39, the dog or slide 20 and the piston 31 are linked together so that both will be raised and lowered simultaneously.

To one side of the piston assembly 27, the base plate 17 adjacent its upper edge is provided with a forwardly projecting boss 45 (Fig. 4) having a threaded opening therein into which a shoulder bolt 46 of the Allen-head type is threadably received. Rotatably mounted upon this shoulder bolt 46 is the upper head member 47 of a second cylinder assembly designated generally by the numeral 48. This second piston assembly includes a cylindrical piston wall 49 secured or clamped, by means of rods 50, between the underside of the upper cylinder head and a lower cylinder head member 51. The cylinder assembly 48 is provided with a piston 52 from which a piston rod 53 extends downwardly through a suitably packed opening in the lower head member 51, a helical compression spring 54 being provided about the piston rod with its upper end bearing upon the underside of the piston 52 and its lower end residing in a recess 55 formed in the upper side of the lower head member 51. A clevis 56 is threaded or otherwise secured upon the lower exterior end of the piston rod 53 and is rotatably received upon a shoulder bolt 57 that is threaded into a forwardly projecting boss 58 (Fig. 5) formed upon the forward face of a trip cam or disc designated generally by the numeral 59 (Figs. 4 and 5).

The trip cam or disc 59 is rotatably mounted upon the forward side of the base plate 17 adjacent its lower edge. To this end, the base plate has a circular boss 60 formed thereon (Fig. 5) provided with a threaded opening 61 into which a threaded end 62 of a shaft 63 is received, the shaft being provided with a shoulder 64 which abuts the boss 60, as best seen in Fig. 5 when the threaded end of the shaft is fully received within the opening 61 of the boss. If desired, the base plate below the boss 60 may be provided with a threaded opening 65 for receiving a set screw that will engage the threaded end of the shaft 63 and prevent its loosening. The shaft 63 on the free side of the shoulder 64 is provided with a cylindrical bushing 67 and preferably has a washer 66 which separates one end of a bushing from the shoulder, as shown in Fig. 4.

The main body portion of the trip cam or disc 59 is, broadly speaking, circular in shape in the present embodiment and has a forwardly projecting axial hub portion 68 formed thereon and rotatably received upon the bushing 67, the outer portion of the hub 68 being threaded, as shown in Fig. 5. A bracket member, designated generally by the numeral 69, is slipped axially over the hub portion of the trip cam or disc 59 so that the inner face of the bracket is in frictional contact with the forward face of the generally circular main body portion of the disc. A nut 70 is threaded upon the outer end of the hub portion 68 of the disc member so as forcefully to press the bracket 69 into tight contact with the face of the disc. If desired, the bracket 69 may have an ear 71 formed on one side thereof (Fig. 4) which may have a threaded opening 72 provided therein for receiving a set screw, the inner end of which will bear upon the face of the disc member 59 and positively prevent relative rotation between the bracket and the disc. The set screw may, if desired, have its inner end threaded into, or otherwise received in, an opening provided in the face of the cam, thereby locking the bracket positively to the disc or cam member 59.

The disc or cam member 59, with the bracket 69 thereon, is preferably retained upon the shaft 63 by means of a washer 73 and a nut 74, the latter of which is threadably received upon a reduced threaded outer end 75 of the shaft.

The bracket 69, at its lower end, is provided with a split type laterally extending passage 76 for receiving one end of a rod 77 which extends forwardly from the bracket and is an integral part of the guard assembly 18, the bracket being provided with screws 78 for clamping the rod in the passage, as best seen in Fig. 5. As seen in the drawings, the rod 77 is of U-shaped construction extending forwardly from the bracket 69 and then transversely across the front of the machine and thence rearwardly where its opposite end is received in another bracket 79 rotatably mounted upon a trunnion 80 provided upon a plate 81 mounted in any suitable fashion upon the frame 11 of the press directly opposite the location of the base plate 17. The rod 77 at the front of the press may be rubber covered, as at 82, so as to permit engagement of the rod with the work bed 12 of the press without shock when the guard assembly 18 is lowered to its full safety position. Any suitable framework providing a guard for the work receiving area on the work bed 12 of the press may be built up upon the rod 77. In the drawings, this guard structure comprises a pair of upstanding rods 83 and 84 welded at their lower ends to the rod 77 and extending upwardly therefrom with their upper ends joined by transverse rod 85 forming a rectangular frame for a guard screen 86. This frame is reenforced by a pair of rods 87 and 88 that extend diagonally downwardly from the upper corners of the frame to the rod 77.

The cam or disc member 59 is an integral, operating part of the guard assembly as a whole and is located directly beneath the dog or slide 20 and is adapted to cooperate therewith, as best seen in Figs. 4 and 6. From these views, it will be noted that when the guard assembly 18 is in its raised or retracted position (shown in Fig. 6 and by the broken lines in Fig. 1), the lower end 88 of the slide rests upon the smooth peripheral surface 89 of the disc. On the other hand, when the guard assembly 18 is lowered, the disc member 59 is rotated in a counter-clockwise direction (as viewed in Figs. 4 and 6) to bring a slot provided in the cam to a position directly beneath the slide 20, this slot having a radially extending wall 90 and a floor 91. In the normal position (Fig. 6) of the disc 59, the wall 90 of the slot is in stopping engagement with the end of a threaded stop screw 92 that is threaded through a forwardly projecting bracket 93 provided on the forward side of the base plate 17 adjacent its right-hand edge. The stop screw 92 may be provided with a lock nut 94 by means of which its adjustable position may be locked with respect to the base plate 17 and the disc member 59. The adjustable positioning of this stop screw selectively determines the raised or retracted position of the guard assembly 18, as is further explained below.

The base portion 10 of the press has a treadle 100 pivotally mounted thereon at 101, the treadle being biased upwardly by a spring 102 that is secured at its upper end to the inner side of one of the legs of the base. The treadle is arranged in any suitable fashion to operate a three-way air valve 103 to which an air pressure supply line 104 is connected. When the treadle 100 is in its normal upper position, the valve 103 is closed. However, when the operator of the press depresses the treadle 100, the valve 103 is opened to introduce air under pressure from the line 104 into a line 105 extending to an elbow 106 threaded into the upper head member 47. Air is thus introduced into the upper end of the cylinder 48, thereby depressing the piston 52 against the force of the helical spring 54. This depression of the piston 52, through the agency of the piston rod 53, rotates the disc member 59 in a counter-clockwise direction, lowering the guard assembly 18 to its safety position and at the same time bringing the slot in the disc 59 into position directly beneath the dog or slide 20. When the slot reaches this position, the slide 20, due to the compressive force of the spring 34 in the cylinder 27, is moved downwardly into the slot, with the lower end 88 of the slide coming into forceful contact with the bottom 91 and behind the wall 90, thereby locking the disc against clockwise rotation and thus preventing restoring movement of the guard to its raised position. This downward movement of the slide 20 also pulls downwardly on a clutch rod 107 that extends from the swivel member 38 to the clutch operating arm 16, thereby engaging the clutch of the press and causing the punch element 14 of the press to make a downward work stroke.

The end of the crank shaft 13 seen in Fig. 3 is provided with a cam 108 that comes into contact with a roller 109 on a valve operating plunger 110 of an air valve 111 as the punch assembly 14 of the press reaches the bottom of its stroke. The cam 108 momentarily actuates the plunger 110 to open the valve 111 which, like the valve 103, is a three-way valve having air pressure supplied thereto from the line 104. Momentary opening of the valve 111 at the bottom of the work stroke of the press introduces air under pressure through the valve and into a line 112 leading (through an elbow 113 that is threaded into an opening 114 provided in the lower head member 29) into the lower end of the cylinder 27. This momentary introduction of air under pressure into the cylinder 27 raises the piston 30 therein against the force of the spring 34 and, consequently, lifts the slide 20 out of the slot provided in the disc member 59 and simultaneously, through the medium of the clutch operating rod 107, disengages the clutch of the press. If, in the meantime, the operator has lifted his foot from the treadle, the air valve 103 will have been returned immediately to its normal position wherein the air pressure previously introduced into the cylinder 48 will have been vented through the valve and, immediately upon the lifting of the slide 20 from the slot in the disc, the compressed spring 54 will rotate the disc 59 in a clockwise direction, physically obstructing returning downward movement of the slide 20 and at the same time raising the guard assembly from its lowered safety position to its raised or retracted position, giving access to the work receiving area of the press. If, on the other hand, the operator's foot remains on the treadle at the time the press reaches the bottom of its downward stroke, the momentary opening of the valve 111 by the cam 108 will cause the slide 20 to be lifted, as previously explained, but the air pressure in the cylinder 48 will remain therein and the spring 54 thus will not rotate the disc. Although the slide 20 will be momentarily lifted out of the slot in the disc, the slide will immediately be returned to its locking position in the slot when the short cam 108 clears the roller 109 of the operating plunger 110 of the valve 111 and permits the air pressure in the cylinder 27 to be vented through that valve. This immediate returning movement of the slide into the slot of the disc again engages the clutch of the press, or prepares it for engagement, so that the press will make another stroke and, at the same time, return of the slide into the slot of the disc positively locks the guard again in its safety position.

From the foregoing description, it will be apparent that the guard assembly, of which the disc or cam 59 is an operating part, physically obstructs and prevents movement of the clutch operating slide or dog 20 into "clutch engaging" position at all times except when the guard assembly is actually in its full safety position. For example, if an unused tool or the like should be lying on the work bed of the press in position where it would prevent the guard assembly from being lowered to its full safety position, the cam or disc member 59 would not be rotated sufficiently to permit the slide or dog 20 to drop into the slot. On the contrary, the lower end of the slide would continue to ride upon the shoulder or raised smooth surface 89 of the disc in its raised position and thereby positively prevent engagement of the press. It will also be noted, however, that when the slide has dropped into its "clutch engaging" position in the slot of the disc, the slide itself latches the guard assembly in its full safety position and positively prevents restoring movement of the guard until after the slide is returned to its "clutch disengaging" position. These features of the present guard mechanism, along with others previously referred to, provide the maximum in safety and render the mechanism fool proof.

Among its many other features it will also be noted that failure of the air pressure leading to the present safety mechanism will cause the press to halt in a full safe condition with the guard assembly in its lowered position or with the guard assembly in its raised position wherein the clutch operating slide or dog 20 is positively retained by the disc of the guard assembly in its "clutch disengage" position.

The foregoing description of one embodiment of the invention has been given for clearness of understanding only and no unnecessary limitations are intended thereby, for it will be apparent to those skilled in the art that numerous variations and modifications may be made in the safety mechanism within the spirit and scope of the appended claim. For example, it will immediately be apparent to those skilled in the art that the disc or cam 59 in the present embodiment has been shown as circular in its general configuration merely for convenience in manufacture, the disc, of course, need not be circular but may be of any suitable shape having a raised shoulder portion thereon terminating at one end in a slot or the equivalent thereof for receiving the dog or slide 20, the shoulder serving to retain the slide or dog in its "clutch disengaged" position when the guard assembly is out of its full safety position.

I claim:

Safety guard mechanism for a power operated machine tool having a work-piece receiving area and a clutch engageable to initiate a work stroke by said machine tool upon said work-piece comprising, a guard assembly pivotally mounted on said machine about an axis and movable between a retracted position permitting access to said work area and a safety position blocking access to said area, clutch operating means movable between a first position wherein said clutch is disengaged and a second position wherein said clutch is engaged to initiate said work stroke, said guard assembly and said clutch operating means including cooperative control means operative so that said guard assembly in its said retracted position physically obstructs and prevents movement of said clutch operating means from its said first position to its said second position, thereby preventing engagement of said clutch when said guard assembly is retracted, and operative so that said clutch operating means in its said second position physically obstructs and prevents movement of said guard assembly from its said safety position to its said retracted position, thereby preventing retraction of said guard assembly when said clutch is engaged, said cooperating control means including in said clutch operating means a longitudinally movable slide resiliently biased toward clutch engaging position and including in said guard assembly a disc rotatably mounted in the path of said slide and having a slot therein, one end of said slide being adapted to enter said slot and thereby lock said guard assembly in its said safety position.

References Cited in the file of this patent

UNITED STATES PATENTS

| 1,958,151 | Napier | May 8, 1934 |
| 2,339,214 | Yanchenko | Jan. 11, 1944 |

FOREIGN PATENTS

| 112,494 | Sweden | Nov. 21, 1944 |
| 636,095 | Great Britain | Apr. 19, 1950 |
| 645,378 | Great Britain | Nov. 1, 1950 |
| 689,655 | Great Britain | Apr. 1, 1953 |